(12) United States Patent
Kamiya et al.

(10) Patent No.: US 12,447,077 B2
(45) Date of Patent: Oct. 21, 2025

(54) ASSISTANCE INFORMATION MANAGEMENT SYSTEM

(71) Applicant: FUJI CORPORATION, Aichi-ken (JP)

(72) Inventors: Yuki Kamiya, Toyoake (JP); Takehiro Hiraoka, Chiryu (JP); Satoshi Shimizu, Chiryu (JP); Ryu Takahashi, Toyota (JP)

(73) Assignee: FUJI CORPORATION, Aichi-ken (JP)

( * ) Notice: Subject to any disclaimer, the term of this patent is extended or adjusted under 35 U.S.C. 154(b) by 473 days.

(21) Appl. No.: 17/436,066

(22) PCT Filed: Mar. 5, 2019

(86) PCT No.: PCT/JP2019/008719
§ 371 (c)(1),
(2) Date: Sep. 2, 2021

(87) PCT Pub. No.: WO2020/178993
PCT Pub. Date: Sep. 10, 2020

(65) Prior Publication Data
US 2022/0175598 A1    Jun. 9, 2022

(51) Int. Cl.
*G16H 10/60* (2018.01)
*A61G 5/12* (2006.01)
(Continued)

(52) U.S. Cl.
CPC .......... *A61G 5/12* (2013.01); *A61G 5/14* (2013.01); *G16H 10/60* (2018.01); *G16H 50/30* (2018.01); *A61G 2203/10* (2013.01)

(58) Field of Classification Search
CPC ........ A61G 5/12; A61G 5/14; A61G 2203/10; G16H 10/60; G16H 50/30
See application file for complete search history.

(56) References Cited

U.S. PATENT DOCUMENTS 9,501,613 B1 * 11/2016 Hanson ............... G16H 40/67
9,669,549 B2 *  6/2017 Suzuki ................ A61G 7/1046
(Continued)

FOREIGN PATENT DOCUMENTS

JP    2005332324    12/2005
JP    2006048554     2/2006
(Continued)

OTHER PUBLICATIONS

"International Search Report (Form PCT/ISA/210) of PCT/JP2019/008719," mailed on Apr. 16, 2019, with English translation thereof, pp. 1-2.

*Primary Examiner* — Kenneth Bartley
(74) *Attorney, Agent, or Firm* — JCIPRNET

(57) ABSTRACT

An assistance information management system including a usage record data storage section, an assistance record data storage section, an association section, and a presentation section. The usage record data storage section is configured to store usage record data in which usage information on use of an assistance device is recorded in association with usage time information and assisted person identification information. The assistance record data storage section is configured to store assistance record data, an extraction section configured to extract the usage information and the assisted person management information on a specific assisted person. The association section is configured to associate the usage information and the assisted person management information with each other based on the usage time information and the management time information. The presentation section is configured to present the associated usage information and the assisted person management information in a visually recognizable manner.

12 Claims, 7 Drawing Sheets

(51) Int. Cl.
*A61G 5/14* (2006.01)
*G16H 50/30* (2018.01)

(56) References Cited

U.S. PATENT DOCUMENTS

| | | | | |
|---|---|---|---|---|
| 10,045,895 | B2* | 8/2018 | Eklof | A61G 7/1094 |
| 10,813,805 | B2* | 10/2020 | Tsusaka | A61G 7/1046 |
| 11,094,180 | B1* | 8/2021 | Williams | G06N 3/045 |
| 11,096,848 | B2* | 8/2021 | Isozumi | A61G 7/1019 |
| 2004/0030531 | A1* | 2/2004 | Miller | G16H 40/67 |
| | | | | 702/182 |
| 2009/0259495 | A1* | 10/2009 | Rosenfeld | A61B 5/0205 |
| | | | | 705/2 |
| 2011/0010188 | A1* | 1/2011 | Yoshikawa | H04L 63/0861 |
| | | | | 705/2 |
| 2011/0301440 | A1 | 12/2011 | Riley et al. | |
| 2012/0259245 | A1* | 10/2012 | Receveur | A61G 7/0514 |
| | | | | 5/616 |
| 2012/0259248 | A1* | 10/2012 | Receveur | G16Z 99/00 |
| | | | | 600/595 |
| 2012/0302843 | A1* | 11/2012 | Otsubo | G16H 20/60 |
| | | | | 600/301 |
| 2013/0219615 | A1* | 8/2013 | Eklof | A61G 5/14 |
| | | | | 5/83.1 |
| 2014/0013503 | A1* | 1/2014 | Dixon | A61G 7/1065 |
| | | | | 5/85.1 |
| 2015/0294481 | A1* | 10/2015 | Sakaue | G06V 40/23 |
| | | | | 600/595 |
| 2016/0012194 | A1* | 1/2016 | Prakash | G16H 40/40 |
| | | | | 705/2 |
| 2016/0027278 | A1* | 1/2016 | Mcintosh | G08B 21/0423 |
| | | | | 715/741 |
| 2016/0143593 | A1* | 5/2016 | Fu | G16H 20/40 |
| | | | | 600/595 |
| 2018/0064357 | A1* | 3/2018 | Motoyama | A61B 5/316 |
| 2018/0122209 | A1* | 5/2018 | Jefferson | A61B 5/0015 |
| 2019/0290209 | A1* | 9/2019 | Fu | A61B 5/7264 |
| 2020/0101364 | A1* | 4/2020 | Lane, II | A63B 24/0062 |

FOREIGN PATENT DOCUMENTS

| | | | | |
|---|---|---|---|---|
| JP | 2008073501 | | 4/2008 | |
| JP | 2015165879 | | 9/2015 | |
| JP | 2015165879 | A * | 9/2015 | |
| WO | 2014192085 | | 12/2014 | |
| WO | WO-2014192085 | A1 * | 12/2014 | A61G 5/14 |
| WO | WO-2017060964 | A1 * | 4/2017 | A61G 7/1017 |
| WO | WO-2017061136 | A1 * | 4/2017 | A61G 7/1017 |
| WO | WO-2017061151 | A1 * | 4/2017 | A61G 5/14 |
| WO | WO-2017094128 | A1 * | 6/2017 | A61G 7/1019 |
| WO | WO-2017134815 | A1 * | 8/2017 | A61G 7/1017 |
| WO | WO-2017141335 | A1 * | 8/2017 | A61G 7/10 |
| WO | WO-2017199349 | A1 * | 11/2017 | A61G 5/00 |
| WO | 2018047326 | | 3/2018 | |
| WO | 2018051405 | | 3/2018 | |
| WO | WO-2018047326 | A1 * | 3/2018 | A61G 5/14 |

\* cited by examiner

[Fig. 1]
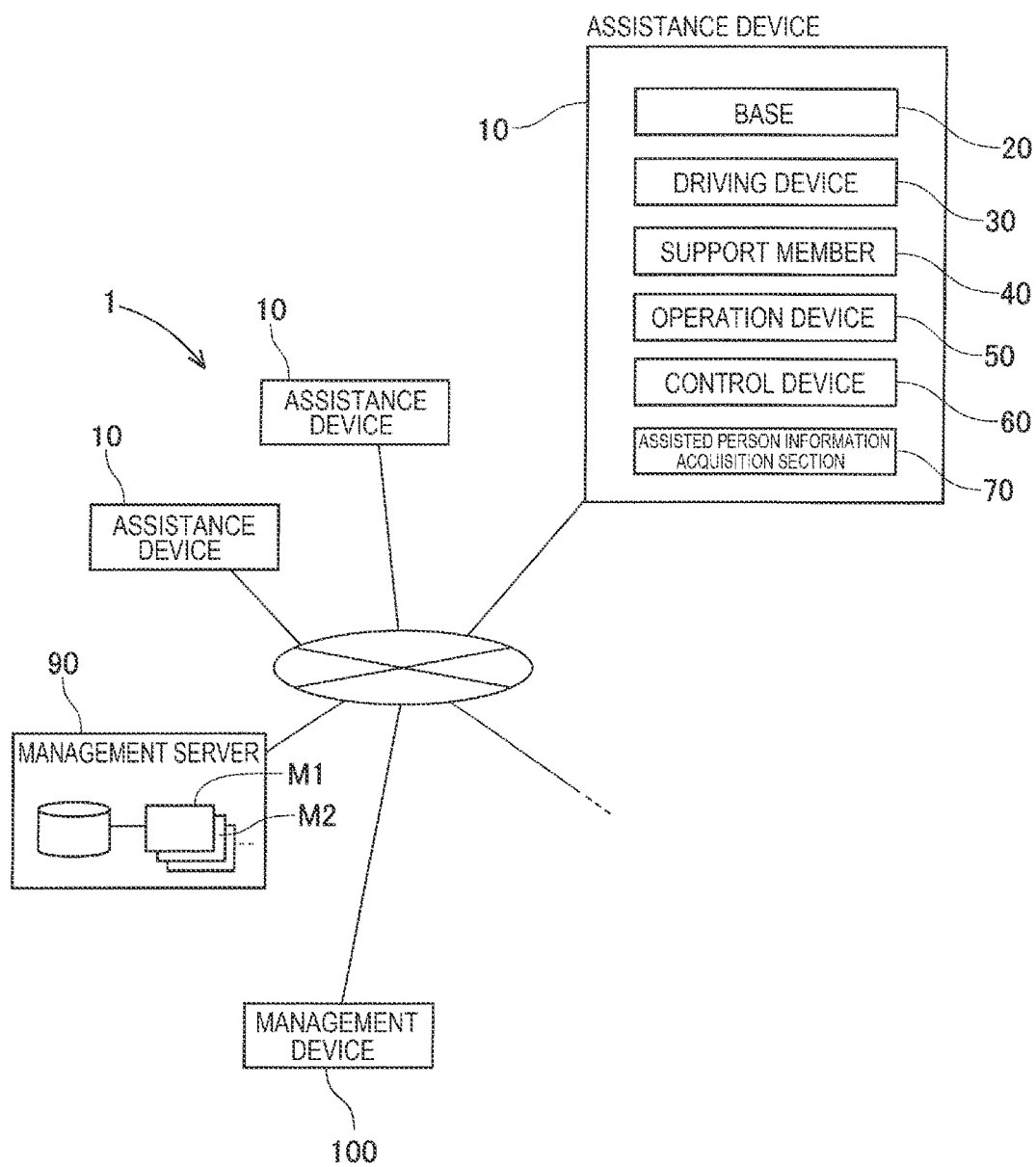

[Fig. 2]
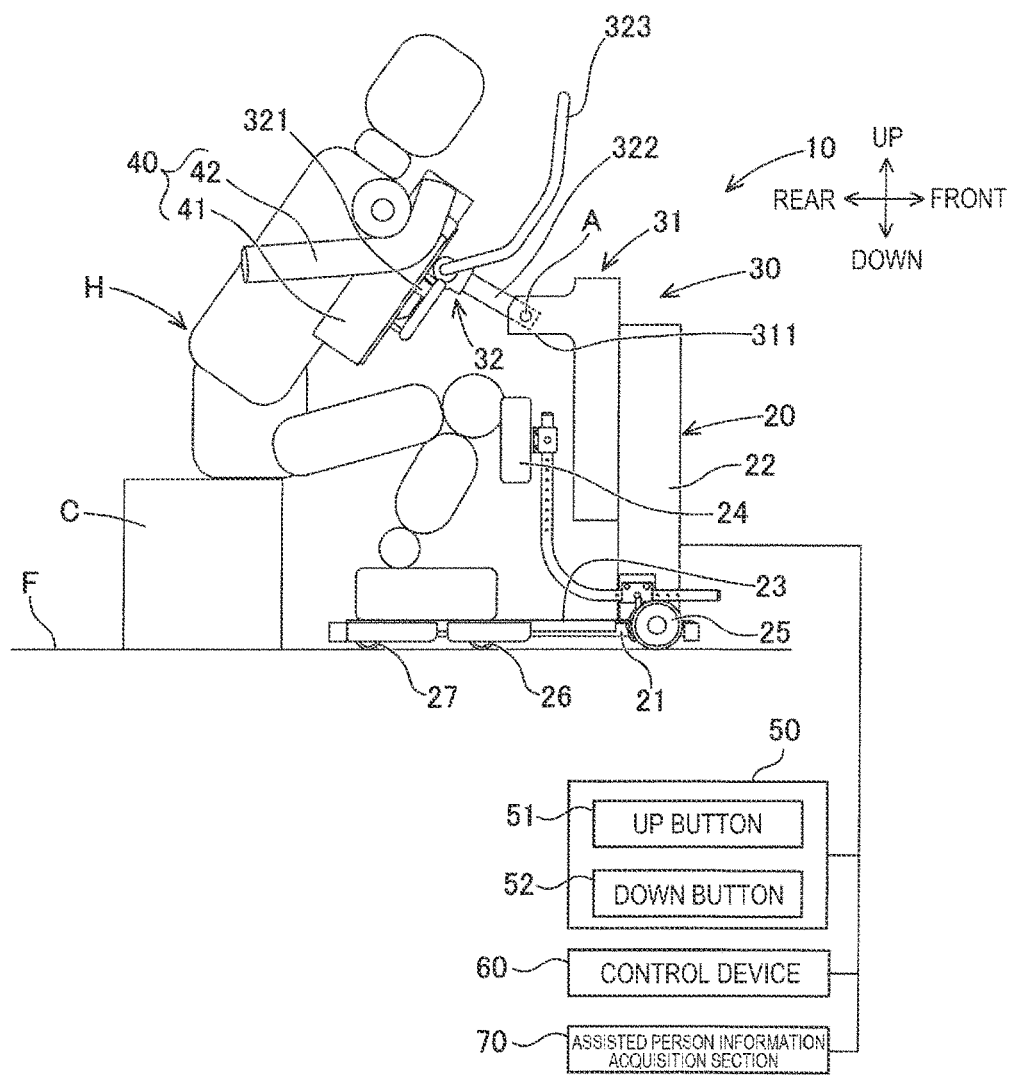

[Fig. 3]
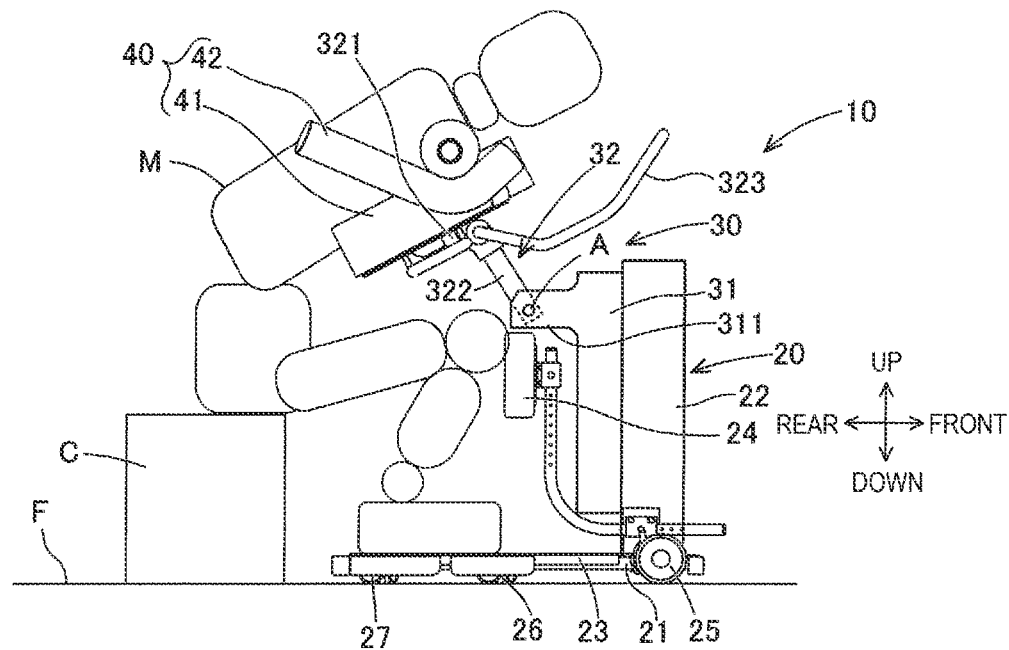
[Fig. 4]
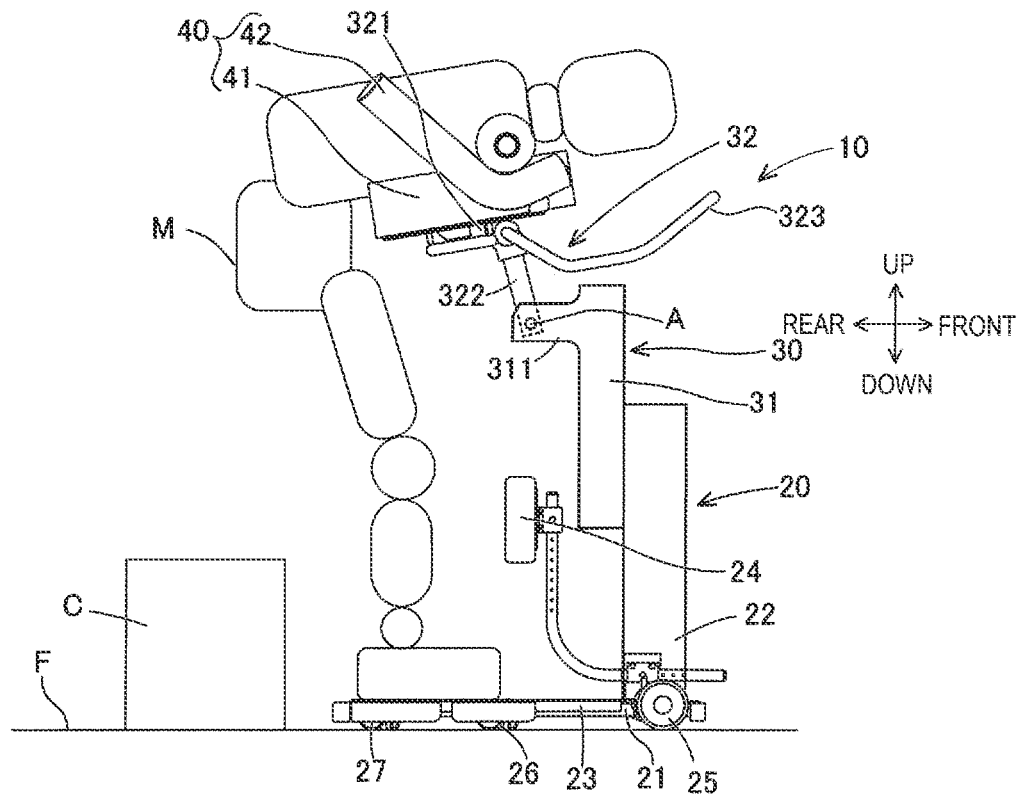

[Fig. 5]
[Fig. 6]
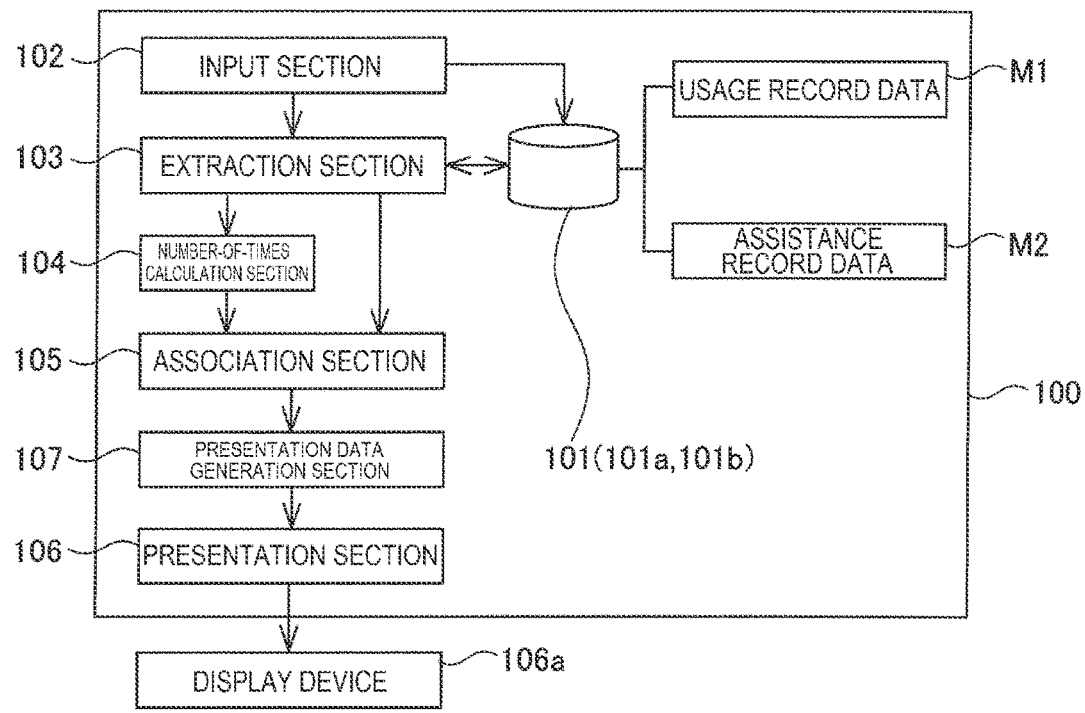

| MANAGEMENT TIME INFORMATION | PHYSICAL RECORD INFORMATION (ASSISTED PERSON MANAGEMENT INFORMATION) | |
|---|---|---|
| DATE | WEIGHT | BLOOD PRESSURE VALUE |
| M/D1 | ***.* kg | |
| M/D1 | | ~* |
| : | : | : |
| : | : | : |

| MANAGEMENT TIME INFORMATION | | PHYSICAL RECORD INFORMATION (ASSISTED PERSON MANAGEMENT INFORMATION) | |
|---|---|---|---|
| DATE | TIME | DIAPER REPLACEMENT | ADMINISTRATION OF LAXATIVES |
| M/D1 | h: m: s | 〇 | |
| | h: m: s | 〇 | |
| | h: m: s | | 〇 |
| M/D1~M/D7 | | ** TIMES | * TIMES |
| M/D8 | h: m: s | 〇 | |
| | h: m: s | 〇 | |

| MANAGEMENT TIME INFORMATION | | PHYSICAL RECORD INFORMATION (ASSISTED PERSON MANAGEMENT INFORMATION) | | |
|---|---|---|---|---|
| DATE | TIME | USING TOILET | BATHING | RECREATION |
| M/D1 | h: m: s | 〇 | | |
| | h: m: s | | 〇 | |
| | h: m: s | | | 〇 |
| M/D1~M/D7 | | ** TIMES | * TIMES | * TIMES |
| M/D8 | h: m: s | 〇 | | |
| | h: m: s | | 〇 | |

[Fig. 10]
M3
MR/MS ○○ ○○ <ID:******>
| MANAGEMENT TIME INFORMATION | | USAGE INFORMATION | PHYSICAL RECORD INFORMATION (ASSISTED PERSON MANAGEMENT INFORMATION) | | |
|---|---|---|---|---|---|
| DATE | TIME | | USING TOILET | BATHING | RECREATION |
| M/D1 | h: m: s | ○ | | | |
| | h: m: s | | ○ | | |
| | h: m: s | ○ | | | ○ |
| | h: m: s | | | ○ | |
| | h: m: s | ○ | | | |
| | h: m: s | | | | ○ |
| | | | | | |
[Fig. 11]
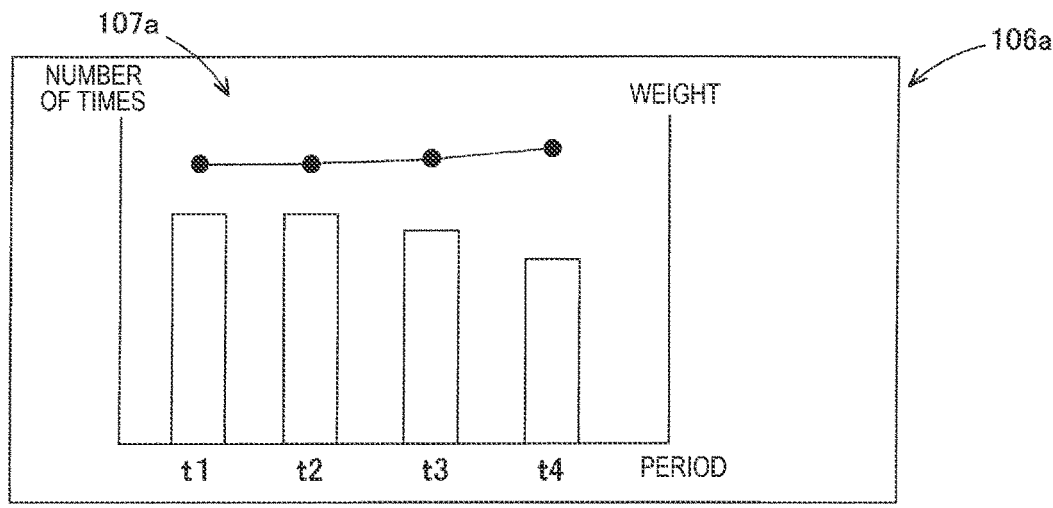
[Fig. 12]
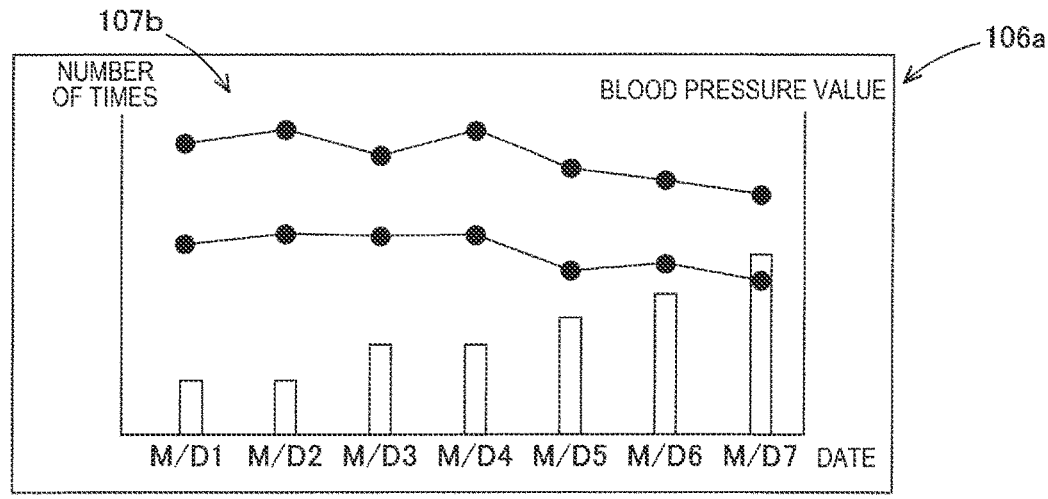

[Fig. 13]
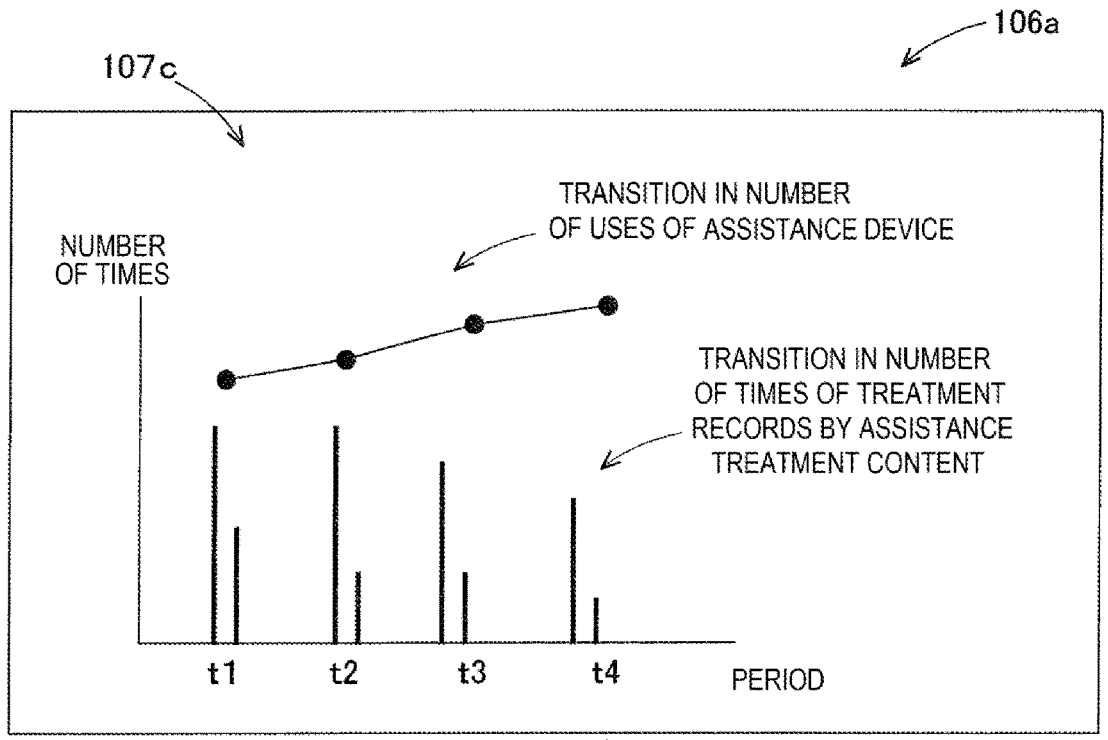
[Fig. 14]
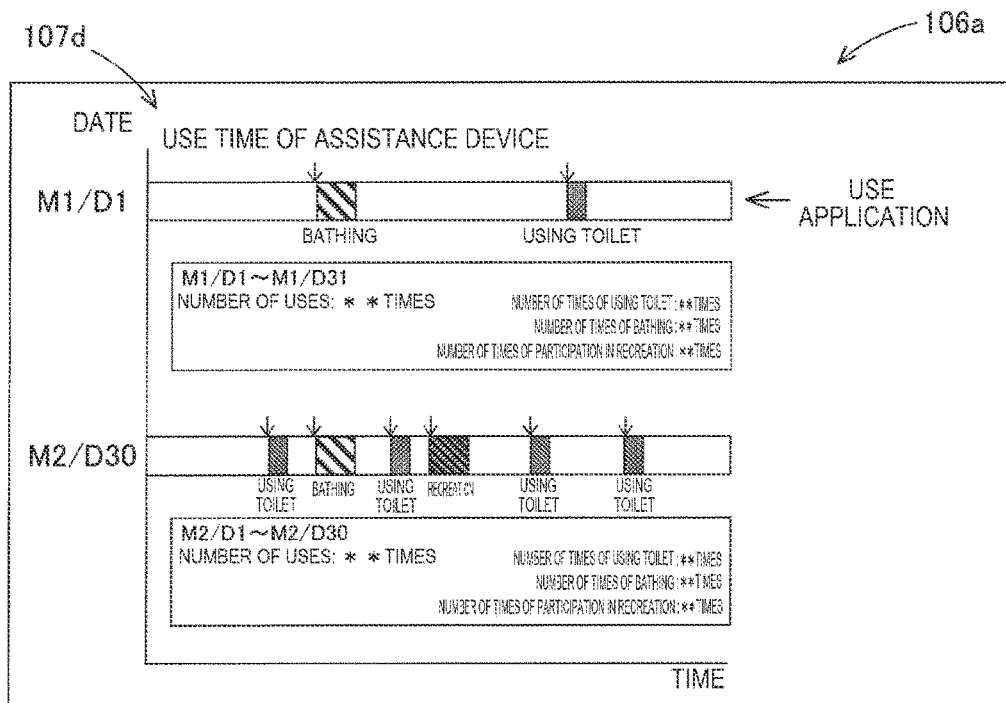

ASSISTANCE INFORMATION MANAGEMENT SYSTEM

CROSS-REFERENCE TO RELATED APPLICATION

This application is a 371 application of the international PCT application serial no. PCT/JP2019/008719, filed on Mar. 5, 2019. The entirety of the above-mentioned patent application is hereby incorporated by reference herein and made a part of this specification.

TECHNICAL FIELD

The present disclosure relates to an assistance information management system.

BACKGROUND ART

Patent Literature 1 discloses an assistance device that assists a transfer operation of an assisted person. In assisting the transfer operation, the assistance device changes directions after a standing operation of lifting buttocks of the assisted person in a sitting posture from a seating surface is completed and executes a sitting operation of lowering the buttocks of the assisted person to seat the assisted person. As a result, the assisted person is transferred from a bed to a wheelchair, for example.

PATENT LITERATURE

Patent Literature 1: JP-A-2008-073501

SUMMARY OF THE DISCLOSURE

Technical Problem

It is difficult for an assisting person to grasp what kind of change is occurred in the assisted person using the assistance device compared to before use. In this regard, it is demanded to obtain information for easily grasping an association between a use state of the assistance device and a change of the assisted person accompanying the use state.

It is an object of the present specification to provide an assistance information management system that presents information for easily grasping an association between a use state of an assistance device by an assisted person and a change of the assisted person accompanying the use state.

Solution to Problem

The present specification discloses an assistance information management system including a usage record data storage section configured to store usage record data in which usage information on use of an assistance device assisting an operation of an assisted person is recorded in association with usage time information on a date and time when the assistance device is used and assisted person identification information used to identify the assisted person using the assistance device, an assistance record data storage section configured to store assistance record data in which assisted person management information which is information on the assisted person and is changeable with a passage of time is recorded in association with management time information on a time of the assisted person management information and the assisted person identification information, an extraction section configured to extract the usage information and the assisted person management information on a specific assisted person based on the assisted person identification information included in the usage record data and the assisted person identification information included in the assistance record data, an association section configured to associate the usage information and the assisted person management information with each other, which are extracted by the extraction section, based on the usage time information and the management time information, and a presentation section configured to present the usage information and the assisted person management information associated by the association section in a visually recognizable manner.

Advantageous Effect of the Disclosure

According to the present disclosure, the user of the assistance information management system can easily grasp the association between the use state of the assistance device by the assisted person and the change of the assisted person accompanying the use state by confirming the presented usage information and the assisted person management information.

BRIEF DESCRIPTION OF DRAWINGS

FIG. 1 is a schematic diagram of an assistance information management system according to an embodiment.
FIG. 2 is a side view of the assistance device that supports an assisted person in a sitting posture.
FIG. 3 is a side view of the assistance device that supports the assisted person in a standing preparation posture.
FIG. 4 is a side view of the assistance device that supports the assisted person in a standing posture.
FIG. 5 is a diagram illustrating a configuration of a management device.
FIG. 6 is a table illustrating an example of usage record data.
FIG. 7 is a table illustrating an example of physical record information that is assistance record data.
FIG. 8 is a table illustrating an example of treatment record information that is the assistance record data.
FIG. 9 is a table illustrating an example of action record information that is the assistance record data.
FIG. 10 is a table illustrating a process of associating usage information with the action record information.
FIG. 11 is a graph illustrating an example of display data on a transition in the number of uses of the assistance device and a transition in weight in a specific assisted person,
FIG. 12 is a graph illustrating an example of display data on a transition in the number of uses of the assistance device and a transition in the blood pressure value in the specific assisted person.
FIG. 13 is a graph illustrating an example of display data on a transition in the number of uses of the assistance device and a transition in the number of times of specific assistance treatments in the specific assisted person.
FIG. 14 is a graph illustrating an example of display data on a transition in the number of uses of the assistance device and a transition in the number of specific actions in the specific assisted person.

DESCRIPTION OF EMBODIMENTS

1. Outline of Assistance Information Management System

An assistance information management system records sage information on use of an assistance device that assists an operation of an assisted person, as usage record data. In the usage record data, assisted person identification information capable of identifying the assisted person used is recorded in association with the usage information. As a result, the assistance information management system can grasp a usage history of the assistance device for each assisted person based on the usage record data. Furthermore, in the usage record data, usage time information on the time when the assistance device is used is stored in association with the usage information and the assisted person identification information. Accordingly, the assistance information management system can grasp the time during which a specific assisted person uses the assistance device based on the usage record data.

The assistance information management system further records assisted person management information which is information on the assisted person and may change with a passage of time, as assistance record data. In the assistance record data, the assisted person identification information is recorded in association with the assisted person management information. Accordingly, the assistance information management system can grasp the assisted person management information for each assisted person based on the assistance record data, in addition, in the assistance record data, management time information on the time of the assisted person management information is stored in association with the assisted person management information. Accordingly, the assistance information management system can grasp the time relating to the assisted person management information of a specific assisted person based on the assistance record data.

In addition, the assistance information management system presents the associated usage information and the assisted person management information in a visually recognizable manner. At this time, the assistance information system extracts the usage information and the assisted person management information on the specific assisted person associated via the assisted person identification information from the usage record data and the assistance record data. Furthermore, the assistance information management system associates the usage information on a specific assisted person with the assisted person management information based on the usage time information and the management time information, and presents the associated usage information and the assisted person management information. As a result, the assisting person or the like using the assistance information management system can easily grasp an association between the use state of the assistance device by the assisted person and the change of the assisted person accompanying the use state by confirming the presented usage information and the assisted person management information.

2. Schematic Configuration of Assistance Information Management System 1

Hereinafter, embodiments in which the assistance information management system is embodied will be described with reference to the drawings. First, a schematic configuration of assistance information management system 1 will be described with reference to FIG. 1.

As illustrated in FIG. 1, assistance information management system 1 mainly includes one or more assistance devices 10, management server 90, and one or more management devices 100. Assistance device 10 is used when assisting the operation of the assisted person. In assistance information management system 1, all assistance device 10 and management device 100 are communicably connected to management server 90 via the Internet, and management device 100 integrates and manages all assistance device 10 provided in assistance information management system 1.

Assistance device 10 assists assisted person H (refer to FIG. 2) in a standing operation from a sitting posture to a standing posture, and assists a sitting operation from the standing posture to the sitting posture. The "standing posture" of assisted person H refers to a posture in which the lower half body of assisted person H is standing, regardless of the posture of the upper half body. That is, the standing operation of assisted person H is an operation of lifting the buttocks of assisted person H to take a standing posture. In addition, the sitting operation of assisted person H is an operation of lowering the buttocks of assisted person H to take a sitting posture.

Assistance device 10 supports, for example, a portion of the body of assisted person H (for example, upper half body of assisted person H), changes directions after assisting the standing operation of assisted person H in the sitting posture, and assists the transfer operation to assist the sitting operation so as to be seated again at another position. Such a transfer operation is executed, for example, for the purpose of transfer between a bed and a wheelchair in a living room, transfer from a bed in a living room to a toilet bowl in a toilet room, or the like.

Furthermore, assistance device 10 stores usage record data M1 in which the usage information on the usage is recorded. The usage information is information indicating that assistance device 10 is used, and in usage record data M1, information used to identify assisted person H using assistance device 10 and information on the date and time when assistance device 10 is used are recorded in association with the usage information. Assistance device 10 uploads recorded usage record data M1 to management server 90.

Management server 90 stores usage record data M1 uploaded from multiple assistance devices 10. Management server 90 transmits usage record data M1 to management device 100 in response to the request of management device 100. Management server 90 can transmit only a part of usage record data M1 in response to the request among all stored usage record data M1 to management device 100. For example, management server 90 may transmit only usage record data M1 on specific assisted person H to management device 100. As a result, management device 100 can appropriately download only the necessary information from management server 90.

Management device 100 has all assistance devices 10 provided in assistance information management system 1 as a management target, acquires usage record data M1 recorded by each assistance device 10 from management server 90, and stores usage record data M1. Furthermore, management device 100 stores assistance record data M2 which is information on assisted person H using assistance device 10, and is recorded by the assisting person or the like assisting assisted person H. Management device 100 provides various types of information based on usage record data M1 and assistance record data M2. Examples of management device 100 include a personal computer installed in a facility where assistance device 10 is installed, and a terminal device such as a portable terminal (smartphone and tablet terminal). In addition, management device 100 can add information acquired from the outside of assistance device 10 to usage record data M1.

3. Configuration of Assistance Device 10

Next, a configuration of assistance device 10 will be described with reference to FIG. 2. As illustrated in FIG. 2, assistance device 10 is mainly provided with base 20, driving device 30, support member 40, operation device 50, control device 60, and assisted person information acquisition section 70.

Base 20 is mainly provided with frame 21, support column 22, foot placing table 23, lower thigh pad portion 24, and six wheels 25 to 27. Frame 21 is provided substantially horizontally near floor F. Support column 22 is fixed to frame 21 in a state of extending upward from the center in the left-right direction toward the front of frame 21. Support column 22 may be provided so as to be perpendicular to floor F or at a predetermined angle in the front-rear direction.

Foot placing table 23 is fixed to the rear of the upper surface of frame 21 so as to be horizontal. Lower thigh pad portion 24 is fixed to support column 22 so as to be positioned above foot placing table 23. Lower thigh pad portion 24 has a cushion member at a portion with which the lower thigh of assisted person H comes into contact. Three wheels 25 to 27 are each provided on the left and right sides on the lower side of frame 21. Each wheel 25 to 27 has a steering function to change the movement direction. Assistance device 10 is capable of not only moving and changing the direction in the front-rear direction but also laterally moving (moving in the true lateral direction) and spin turn (revolving on the spot) by the steering function of six wheels 25 to 27.

Driving device 30 supports support member 40 that supports the upper half body of assisted person H so as to be movable in the up-down direction and the front-rear direction of base 20. Driving device 30 is provided with lifting and lowering section 31 and swing section 32. In driving device 30, the operation of lifting and lowering section 31 and swing section 32 is controlled by control device 60. Driving device 30 is configured to be able to move support member 40 along a predetermined movement trajectory by cooperating the up-down motion of lifting and lowering section 31 and the revolving motion of swing section 32.

Lifting and lowering section 31 moves linearly in the up-down direction with respect to base 20. Lifting and lowering section 31 is formed in a long elongated shape in the up-down direction and is guided by a guide (not illustrated) on the rear surface of support column 22. Lifting and lowering section 31 is lifted and lowered along the guide of support column 22 by the driving of a linear motion device (not illustrated). Inside lifting and lowering section 31, a motor for revolving swing section 32 (not illustrated) is accommodated. Lifting and lowering section 31 includes swing support section 311. Swing support section 311 rotatably supports swing section 32 around central shaft A.

Swing section 32 revolves around central shaft A provided in lifting and lowering section 31 and causes support member 40 to swing. Swing section 32 is provided with swing main body 321, arm 322, and handle 323. Swing main body 321 is an attachment portion to which support member 40 is attached and detached, and arm 322 and handle 323 are integrally fixed to swing main body 321.

One end of arm 322 is rotatably supported around central shaft A of swing support section 311 of lifting and lowering section 31. Handle 323 is formed in a substantially rectangular frame shape. Arm 322 is rotated by the driving of the motor. In a case where assistance device 10 assists the standing operation, arm 322 is mainly revolved forward from a state of extending rearward. On the other hand, in a case where assistance device 10 assists the sitting operation, arm 322 is mainly revolved rearward so as to be in a state of extending rearward. With the above configuration, swing section 32 is revolved around a horizontal axis (central shaft A) parallel to the left-right direction of base 20 and swings support member 40 attached to swing main body 321 on the tip end side of arm 322.

Handle 323 is formed so as to extend forward and upward from a vicinity of a rear end of arm 322. The side portion of handle 323 is used as a portion gripped by both hands of assisted person H. Furthermore, the side portion and the front portion of handle 323 are used as portions that are gripped by an assisting person to move assistance device 10.

Support member 40 is a member for supporting the upper half body of assisted person H. Support member 40 is provided with trunk support portion 41 and a pair of side support portions 42. Trunk support portion 41 is formed in a planar shape similar to the trunk shape of assisted person H and can be flexibly deformed. The support surface of trunk support portion 41 is in surface contact with the front surface of the trunk of the upper half body of assisted person H and supports the trunk. Specifically, the support surface of trunk support portion 41 supports a range from the chest to the abdomen of assisted person H from below. In addition, trunk support portion 41 is attached to swing main body 321.

The pair of side support portions 42 are supported by trunk support portion 41 and support the sides of assisted person H. Specifically, the pair of side support portions 42 are supported so as to be swingable with respect to trunk support portion 41 on both sides of trunk support portion 41 in the left-right direction. Side support portion 42 is formed in an L shape by a rod-like member. The surface of side support portion 42 is covered with a material that can be flexibly deformed.

Operation device 50 includes multiple buttons corresponding to various operations assisted by assistance device 10. Operation device 50 is provided with up button 51 corresponding to a lifting operation and down button 52 corresponding to a lowering operation. Operation device 50 is connected to control device 60 via, for example, a telescopic signal cable. In a case where any button is pressed, operation device 50 transmits a signal corresponding to the type of the button to control device 60 for a period when the button is pressed.

Control device 60 controls the operations of lifting and lowering section 31 of driving device 30 and swing section 32. In the operation processing for assisting the standing operation or the sitting operation of assisted person H, control device 60 operates lifting and lowering section 31 and swing section 32 based on the operation to operation device 50. Control device 60 controls the movement of support member 40 in cooperation with the up-down motion of lifting and lowering section 31 and the revolving motion of swing section 32 in a case where the standing operation and the sitting operation are executed.

In addition to the above, control device 60 records usage information indicating that assistance device 10 is used. At this time, control device 60 records the usage time information on the date and time when assistance device 10 is used in association with the usage information. For example, in a case where up button 51 or down button 52 is pressed, control device 60 determines that assistance device 10 is used, records the usage information, and records the date and time when up button 51 or down button 52 is pressed as the usage time information.

Assisted person information acquisition section 70 acquires the assisted person identification information capable of identifying assisted person H using assistance device 10, and sends the acquired assisted person identification information to control device 60. When assisted person information acquisition section 70 acquires the assisted person identification information, control device 70 records the acquired assisted person identification information, and records the date and time when the assisted person identification information is acquired as the usage time information. In addition, for example, when the usage information is recorded within a predetermined time after acquiring the assisted person identification information, control device 60 records the assisted person identification information in association with the usage information. Examples of a method of acquiring the assisted person identification information by assisted person information acquisition section 70 include a method using a keyboard, a mouse, a touch panel, a camera, a microphone, and the like. In addition, examples of the assisted person identification information include ID information allocated to each assisted person H, a voice of the assisted person, a face image, and the like.

For example, assisted person H has ID information as the assisted person identification information, and assisted person information acquisition section 70 acquires ID information inputted using an input device such as a keyboard, a mouse, and a touch panel. In addition, assisted person information acquisition section 70 can display assisted person H registered in advance as the user on the touch panel or the like, and acquire the assisted person identification information of one assisted person H selected by the assisting person or the like from displayed assisted persons H. Furthermore, assisted person information acquisition section 70 can also acquire the specified assisted person identification information of assisted person H by executing biometric authentication such as voice authentication based on the voice of assisted person H acquired using the microphone, face authentication based on the face image of assisted person H acquired using the camera, or the like.

4. Assistive Operation by Assistance Device 10

Next, a standing assist operation of assistance device 10 will be described with reference to FIGS. 2 to 4. In the standing assist operation, assistance device 10 enters a standing preparation state illustrated in FIG. 3 from a starting state of a standing assist operation illustrated in FIG. 2, and thereafter enters a standing completion state illustrated in FIG. 4.

As illustrated in FIG. 2, the assisting person moves assistance device 10 in the vicinity of assisted person H in the sitting posture. At this time, the assisting person operates assistance device 10 so that assisted person H in the sitting posture can get on. In addition, the assisting person adjusts the height of lifting and lowering section 31 in accordance with the height of assisted person H. Subsequently, assisted person H causes both legs to enter the lower side of support member 40.

Next, assisted person H places both feet on foot placing table 23, and causes the lower thigh to bring into contact with lower thigh pad portion 24. Furthermore, assisted person H places the trunk on trunk support portion 41. At this time, the upper half body of assisted person H is in a posture tilted slightly ahead in a state supported by support member 40. Assisted person H simultaneously inserts side support portion 42 to the side. In this manner, assistance device 10 is set in the starting state of the standing assist operation. The assisting person causes assisted person H to grip handle 323. The posture of assisted person H at this time is a starting posture of the standing assist operation. Subsequently, the assisting person starts driving assistance device 10 based on a standing assist program of assistance device 10. As a result, lifting and lowering of lifting and lowering section 31 and forward tilting of swing section 32 are executed in cooperation with each other.

When the standing assist program is executed, assistance device 10 enters the standing preparation state illustrated in FIG. 3. The standing preparation state of assistance device 10 is a state immediately before assisted person H in the sitting posture is lifted from chair C. That is, assistance device 10 is in the standing preparation state illustrated in FIG. 3 when lifting and lowering section 31 is lowered and swing section 32 is tilted ahead from the starting state illustrated in FIG. 2. Here, when assistance device 10 is in the standing preparation state, assisted person H is in a state where the trunk is tilted ahead and extended in a state where the buttocks are in contact with the seating surface of chair C. The posture of assisted person H at this time is the standing preparation posture.

As illustrated in FIG. 4, when the standing assist program is further continued, lifting and lowering section 31 lifts and swing section 32 further tilts ahead. As a result, assisted person H changes from the standing preparation posture to the standing posture. That is, the upper half body of assisted person H in the standing posture is in a posture significantly tilted ahead, and the position of the buttocks of assisted person H is located at a position higher than the seating surface of chair C. As a result, the leg portion of assisted person H is in a substantially extended state.

As described above, by tilting forward trunk support portion 41 in a state where assisted person H gets on assistance device 10, assisted person H shifts from the starting posture in the sitting posture to the standing posture via the standing preparation posture. In addition, the sitting assist operation of assistance device 10 is executed in a substantially opposite manner to the standing assist operation. That is, by lowering lifting and lowering section 31 while trunk support portion 41 is tilted rearward, assisted person H can be shifted from the standing posture to the sitting posture. Assisted person H in the sitting posture can easily pull out side support portion 42 from the side.

In addition, assistance device 10 uploads the usage information, the usage time information, and the assisted person identification information recorded by control device 60 to management server 90 as usage record data M1. At this time, the usage information is recorded in usage record data M1 in association with the assisted person identification information and the usage time information.

5. Configuration of Management Device 100

Next, the configuration of management device 100 will be described with reference to FIG. 5. As illustrated in FIG. 5, management device 100 is mainly provided with storage section 101, input section 102, extraction section 103, number-of-times calculation section 104, association section 105, presentation section 106, and presentation data generation section 107.

Storage section 101 includes an optical drive device such as a hard disk device, a flash memory, or the like. Storage section 101 is provided with usage record data storage section 101a in which usage record data M1 acquired from assistance device 10 via management server 90 is stored, and assistance record data storage section 101b in which assistance record data M2 recorded by the assisting person or the like is stored. In assistance record data M2, the assisted person management information on assisted person H is recorded in association with the management time information on the time of the assisted person management information and the assisted person identification information held by assisted person H. In the present embodiment, the assisted person identification information recorded in assistance record data M2 is common to the assisted person identification information included in usage record data M1, and may be information different from the assisted person identification information included in usage record data M1 as long as the information can be associated with the assisted person identification information included in usage record data M1.

Input section 102 receives an input to an input device (not illustrated) operable by an assisting person or the like using assistance information management system 1. Input device provided in management device 100 is, for example, a keyboard, a mouse, a touch panel, or the like. The assisting person or the like inputs the assisted person identification information held by the assisted person H, for example, when extracting the information on specific assisted person H from the various data stored in storage section 101. The input device can also be used when a new assistance record is added to assistance record data M2.

When input section 102 receives the assisted person identification information, extraction section 103 extracts the usage record and the usage time information associated with the assisted person identification information from usage record data M1. Similarly, extraction section 103 extracts the assisted person management information and the management time information associated with the assisted person identification information from assistance record data M2.

Number-of-times calculation section 104 calculates the number of times a specific assisted person H uses assistance device 10 in a predetermined period based on the usage record and the usage time information extracted by extraction section 103. For example, in a case where extraction section 103 extracts the usage record for one week based on the usage time information, number-of-times calculation section 104 calculates the number of uses of assistance device 10 in one week. In addition, number-of-times calculation section 104 can calculate the number of times of assistance device 10 is used in multiple predetermined periods. For example, in a case where extraction section 103 extracts the usage record for four weeks based on the usage time information, number-of-times calculation section 104 can calculate the number of uses of assistance device 10 for each week in four weeks.

In addition, number-of-times calculation section 104 calculates the number of times of the specific assistance treatments performed by the assisting person for specific assisted person H and the number of times of the specific actions performed by specific assisted person H, based on the assisted person management information and the management time information extracted by extraction section 103. The calculation of the number of times by number-of-times calculation section 104 may be executed periodically, or may be executed at a timing when presentation data generation section 107 generates presentation data (described later).

Association section 105 associates the usage information on the specific assisted person extracted by extraction section 103 with the assisted person management information based on the usage time information included in usage record data M1 and the management time information included in assistance record data M2. For example, association section 105 associates the usage information and the assisted person management information at a specific date and time or a specific period. The association processing by association section 105 may be executed periodically, or may be executed at a timing when presentation data generation section 107 generates presentation data described later. In addition, association section 105 may store the result of the association processing in storage section 101, and may acquire the result of the association processing stored in storage section 101 when presentation data generation section 107 generates the presentation data.

Presentation section 106 presents the calculation result of the various times by number-of-times calculation section 104 and the usage information and the assisted person management information associated with each other by association section 105 to display device 106a (refer to FIG. 2) in a visually recognizable manner. Presentation section 106 can present the calculation result of various times, the associated usage information, and the assisted person management information by printing on a predetermined sheet instead of displaying on display device 106a.

Presentation data generation section 107 generates presentation data presented by presentation section 106 as data in which the usage information and the assisted person management information are associated with each other. The presentation data is data processed so that the assisting person or the like can easily grasp the association between the use state of assistance device 10 by assisted person H and the change in assisted person H accompanying the use state. The assisting person or the like can easily grasp the change imparted to assisted person H by using assistance device 10 by referring to the presentation data. The presentation data will be described later with specific examples.

6. Specific Example of Usage Record Data M1

Next, a specific example of usage record data M1 will be described with reference to FIG. 6. Usage record data M1 illustrated in FIG. 6 includes usage time information, assisted person identification information, and usage information. In usage record data M1, the usage information is recorded in association with the usage time information and the assisted person identification information. In usage record data M1 illustrated in FIG. 6, the usage time information and the assisted person identification information associated with a series of usage information are surrounded by dashed lines.

Here, in the example illustrated in FIG. 6, ID information allocated to each of assisted persons H is recorded as the assisted person identification information in usage record data M1. In addition, in the example illustrated in FIG. 6, in a case where up button 51 is continuously pressed for a predetermined time or longer, control device 60 determines that the standing operation by assistance device 10 is assisted, and records the usage information in usage record data M1. Similarly, in a case where down button 52 is continuously pressed for a predetermined time or longer, control device 60 determines that the sitting operation by assistance device 10 is assisted, and records the usage information in usage record data M1.

7. Specific Example of Assistance Record Data M2

Next, specific examples of assistance record data M2 will be described with reference to FIGS. 7 to 9. The assistance record data stores physical record information, treatment record information, and action record information as the assisted person management information. Assistance information management system 1 may store the physical record information, the treatment record information, and the action record information in assistance record data storage section 101b as one assistance record data M2, or may store each of the physical record information, the treatment record information, and the action record information in assistance record data storage section 101b as separate assistance record data M2. Here, for convenience of description, a case where the physical record information, the treatment record information, and the action record information are separate assistance record data M2 will be described as an example.

As illustrated in FIG. 7, the physical record information, which is one of the assisted person management information, is record information on a body of assisted person H registered as the user of assistance device 10. In assistance record data M2 illustrated in FIG. 7, the weight and the blood pressure value of assisted person H are recorded as the physical record information. The assisting person or the like can also record physical record information other than the weight and the blood pressure value (for example, the number of times a predetermined rehabilitation exercise is performed) in assistance record data M2. In addition, in assistance record data M2, the date on which the weight and the blood pressure value of assisted person H are measured is recorded as management time information. The time when the weight and the blood pressure value of assisted person H are measured can be recorded in the physical record information as the management time information. In addition, the assisting person or the like can record the physical record information after the fact without recording the physical record information at the timing when the weight and the blood pressure value of assisted person H are measured.

As illustrated in FIG. 8, the treatment record information, which is one of the assisted person management information, is record information on a specific assistance treatment performed by the assisting person for assisted person H. In assistance record data M2 illustrated in FIG. 8, it is recorded that the diaper replacement and the administration of the laxatives are performed for assisted person H as the treatment record information. In addition, in assistance record data M2, the date and time when the diaper replacement and the administration of the laxatives are performed are recorded as management time information. The assisting person or the like may record treatment record information other than the diaper replacement and the administration of the laxatives (for example, the number of times of administration of a drug other than the laxatives) in assistance record data M2.

Furthermore, in assistance record data M2, treatment frequency information on the number of times of specific assistance treatments performed by the assisting person for assisted person H within a predetermined period is recorded as one of the assisted person management information. The treatment frequency information is information on the number of treatments calculated by number-of-times calculation section 104 based on the treatment record information recorded within a predetermined period. Number-of-times calculation section 104 calculates the number of times of specific assistance treatments performed within a predetermined period (for example, one week or one month), and records the calculation result in assistance record data M2 as the treatment frequency information.

As illustrated in FIG. 9, the action record information, which is one of the assisted person management information, is record information on a specific action performed by assisted person H. The specific action is an action accompanying the use of assistance device 10, and in the assistance record data illustrated in FIG. 9, the specific action is using a toilet, bathing, and participation in recreation, and the assisting person or the like records the action record information in assistance record data M2 in a case where the specific action is performed. Actions other than the above actions can be recorded in assistance record data M2. In addition, in assistance record data M2, the date and time when a specific action is performed are recorded as management time information.

Furthermore, in assistance record data M2, action frequency information on the number of times assisted person H performs a specific action within a predetermined period is recorded as one of the assisted person management information. The action frequency information is information on the action frequency calculated by number-of-times calculation section 104 based on the action record information recorded in the predetermined period. Number-of-times calculation section 104 calculates the number of times assisted person H performs a specific action within a predetermined period, and records the calculation result in assistance record data M2 as the action frequency information.

8. Information Extraction by Extraction Section 103 and Association by Association Section 105

Next, an example of the information extraction by extraction section 103 will be described with reference to a specific example. As illustrated in FIG. 6, when input section 102 receives the input of the assisted person identification information, extraction section 103 collates the inputted assisted person identification information with the assisted person identification information included in usage record data M1. Extraction section 103 extracts the usage information and the usage time information associated with the corresponding assisted person identification information from usage record data M1. Similarly, as illustrated in FIGS. 7 to 9, extraction section 103 collates the assisted person identification information with the assisted person identification information included in assistance record data M2. Extraction section 103 extracts the assisted person management information and the management time information associated with the corresponding assisted person identification information from assistance record data M2.

Subsequently, an example of the association by association section 105 will be described with reference to FIG. 10. Here, although the association between the usage information extracted from usage record data M1 illustrated in FIG. 6 and the action record information extracted from assistance record data M2 illustrated in FIG. 9 is exemplified, the association between the usage information and the physical record information or the treatment record information is also executed in the same manner as in the following example.

As illustrated in FIG. 10, association section 105 arranges the extracted usage information and the action record information on specific assisted person H in time series based on the usage time information and the management time information. Next, association section 105 estimates a time zone when a specific assisted person H performs a specific action based on the management time information. For example, association section 105 estimates that 10 minutes before and after the date and time recorded as the management time information is a time zone when specific assisted person H performs the specific action.

Next, in a case where the use date and time of assistance device 10 recorded as the usage time information on specific assisted person H is included in the time zone when assisted person H performs the specific action, association section 105 specifies that assisted person H uses assistance device 10 in the specific action.

9. Specific Examples of Presentation Data

Next, specific examples of the presentation data will be described with reference to FIGS. 11 to 14. Presentation data generation section 107 generates presentation data in which the usage information and the assisted person management information associated with each other by association section 105 are processed in a visually recognizable manner. FIGS. 11 to 14 illustrate examples of presentation data presented by presentation section 106 to display device 106*a*.

FIG. 11 illustrates, as an example of the presentation data, presentation data 107*a* on the transition in the usage information on specific assisted person H and the transition in the weight, which is one of the physical record information. Presentation data 107*a* presents the transition in the number of uses of assistance device 10 for each week and the transition in the weight for each week in a visually recognizable manner.

In generating presentation data 107*a* illustrated in FIG. 11, extraction section 103 extracts the usage information and the usage time information for four weeks from usage record data M1, and extracts the physical record information and the management time information for the four weeks from assistance record data M2. Next, number-of-times calculation section 104 calculates the number of uses of assistance device 10 by specific assisted person H for each week based on the extracted usage information and the usage time information. Thereafter, presentation data generation section 107 generates presentation data for presenting the time-series change in the number of uses in a manner that can be visually recognized, based on the calculation result by number-of-times calculation section 104.

Subsequently, association section 105 associates the number of uses of assistance device 10 with the measurement date of the weight, which is the physical record information, for every week based on the usage time information and the management time information. Presentation data generation section 107 generates presentation data for presenting a time-series change in the measured value of the weight associated with a time-series change in the number of uses, which is a time-series change in the measured value of the weight, in a manner that can be visually recognized. Presentation section 106 presents presentation data 107*a* indicating the presentation data on the time-series change in the number of uses and the presentation data on the time-series change in the measured value of the weight in a comparable manner to display device 106*a*.

By referring to presentation data 107*a* illustrated in FIG. 11, the assisting person or the like can easily grasp whether or not there is an association between the use state of assistance device 10 and the transition in the weight. In a case where the association is observed between the use state of assistance device 10 and the transition in the weight, the assisting person or the like can recognize that the use of assistance device 10 has an effect on an increase or decrease in the weight (for example, increase in the weight due to an increase in the muscle strength).

FIG. 12 illustrates, as an example of the presentation data, presentation data 107*b* on the transition in the usage information on specific assisted person H and the transition in the blood pressure value, which is one of the physical record information. Presentation data 107*b* presents the transition in the number of daily uses of assistance device 10 in a specific period and the transition in the daily blood pressure value in a visually recognizable manner. Of the two polygonal line graphs illustrated in presentation data 107*b*, the upper polygonal line graph indicates the transition in the maximum blood pressure, and the lower polygonal line graph indicates the transition in the minimum blood pressure.

In generating presentation data 107*b* illustrated in FIG. 12, extraction section 103 extracts the usage information and the usage time information for one week in a specific period from usage record data M1, and extracts the physical record information and the management time information for the one week. Next, number-of-times calculation section 104 calculates the number of daily uses of assistance device 10 by specific assisted person H based on the extracted usage information and the usage time information. Thereafter, presentation data generation section 107 generates presentation data for presenting the time-series change in the number of uses in a manner that can be visually recognized, based on the calculation result by number-of-times calculation section 104.

Subsequently, association section 105 associates the number of uses of assistance device 10 with the measurement date of the blood pressure value as the physical record information daily based on the usage time information and the management time information. Presentation data generation section 107 generates presentation data for presenting, in a manner that can be visually recognized, the time-series change in the extracted blood pressure value and the time-series change in the blood pressure value associated with the time-series change in the number of uses. Presentation section 106 presents presentation data 107*b* indicating the presentation data on the time-series change in the number of uses and the presentation data on the time-series change in the blood pressure value in a comparable manner to display device 106*a*.

By referring to presentation data 107*b* illustrated in FIG. 12, the assisting person or the like can easily grasp whether or not there is an association between the use state of assistance device 10 and the transition in the blood pressure value. For example, in a case where the association is observed between the use state of assistance device 10 and the transition in the blood pressure value, the assisting person or the like can recognize that the use of assistance device 10 has an effect on a change in the blood pressure value (for example, decrease in the maximum blood pressure value or the minimum blood pressure value due to an increase in the number of uses).

FIG. 13 illustrates, as an example of the presentation data, the usage information on specific assisted person H and presentation data 107*c* on the transition in the treatment record information. Presentation data 107*c* presents the transition in the number of uses of assistance device 10 for each week, and the transition in the number of times of diaper replacement and the number of times of administration of the laxatives for each week in a visually recognizable manner. Of the two bar graphs illustrated in FIG. 13, the left graph indicates the number of times of diaper replacement, and the right graph indicates the number of times of administration of the laxatives.

In generating the presentation data illustrated in FIG. 13, extraction section 103 extracts the usage information and the usage time information for four weeks from usage record data M1, and extracts the treatment record information and the management time information for four weeks. Subsequently, number-of-times calculation section 104 calculates the number of uses of assistance device 10 by specific assisted person H for each week based on the extracted usage information and the usage time information. Thereafter, presentation data generation section 107 generates presentation data for presenting the time-series change in the number of uses in a manner that can be visually recognized, based on the calculation result by number-of-times calculation section 104.

Next, association section 105 associates the number of uses of assistance device 10 with a recording date of the treatment record information for every week based on the usage time information and the management time information. Presentation data generation section 107 generates presentation data for presenting the time-series change in the number of times of diaper replacement and the number of times of administration of the laxatives associated with the time-series change in the number of uses, which is the time-series change in the number of times of diaper replacement and the number of times of administration of the laxatives as the extracted treatment record information, in a manner that can be visually recognized. Presentation section 106 presents presentation data 107c indicating the presentation data on the time-series change in the number of uses and the presentation data on the time-series change in the number of diaper replacement and the number of administration of the laxatives in a comparable manner to display device 106a.

By referring to presentation data 107c illustrated in FIG. 13, the assisting person or the like can easily grasp whether or not there is an association between the use state of assistance device 10 and the transition in the number of times of diaper replacement and the number of times of administration of the laxatives. For example, in a case where the association between the use state of assistance device 10 and the number of times of diaper replacement and the number of times of administration of the laxatives is observed, the assisting person or the like can recognize that the use of assistance device 10 has an effect on the change in the number of times of diaper replacement and the number of times of administration of the laxatives (for example, the number of times of diaper replacement or the number of times of administration of the laxatives due to an increase in the number of uses of assistance device 10).

FIG. 14 illustrates, as an example of the presentation data, the usage information on specific assisted person H and presentation data 107d on the transition in the action record information. Presentation data 107d presents a time zone when assisted person H performed a specific action on a specific day in a visually recognizable manner. Presentation data 107d indicates a time zone when the user goes to the toilet, a time zone when the user goes to the bathroom (take a bath), and a time zone when the user participates in the recreation as a time zone when a specific action was performed. In addition, the specific days listed in presentation data 107d are all days when the same assistance schedule (time zones for bathing and recreation are the same) is set. Presentation data 107d includes presentation data indicating the number of uses of assistance device 10, the number of times of using the toilet, the number of times of bathing, and the number of times of participation in recreation every two weeks.

In generating presentation data 107d illustrated in FIG. 14, extraction section 103 extracts the usage information and the usage time information for two months from usage record data M1. Subsequently, number-of-times calculation section 104 calculates the number of uses of assistance device 10 by specific assisted person H every two weeks based on the extracted usage information and the usage time information. In addition, extraction section 103 extracts the action record information and the management time information for two months from assistance record data M2, and number-of-times calculation section 104 calculates the number of times of the specific action by specific assisted person H every two weeks based on the extracted action record information and the management time information. Thereafter, presentation data generation section 107 generates presentation data for presenting the calculation result by number-of-times calculation section 104 in a manner that can be visually recognized.

In addition, extraction section 103 extracts the usage information and the usage time information for a specific day from the extracted usage information and the usage time information for two months, and extracts the action record information and the management time information for the specific day from the action record information and the management time information for two months. Next, association section 105 associates the number of uses of assistance device 10 with a recording date of the action record information daily based on the usage time information and the management time information, and specifies the action corresponding to the use of one assistance devices 10. Presentation data generation section 107 generates presentation data for presenting the action specified by the association section as a use application of assistance device 10.

Presentation section 106 presents presentation data 107d indicating the presentation data on the number of uses of assistance device 10 and the number of specific actions and the presentation data on the use application of assistance device 10 in a comparable manner to display device 106a.

By referring to presentation data 107d illustrated in FIG. 14, the assisting person or the like can easily grasp whether or not there is an association between the transition in the use state of assistance device 10 and the transition in the number of times the specific action is performed. For example, in a case where the association between the transition in the number of uses of assistance device 10 and the transition in the number of times of using the toilet is observed, the assisting person or the like can recognize that there is an effect on the change in the number of times of using the toilet due to the use of assistance device 10 (by reducing the burden on the assisting person, it is easy to go to the toilet without hesitation, for example).

As described above, assistance information management system 1 presents the usage information and the assisted person management information associated via the assisted person identification information, the usage time information, and the management time information in a visually recognizable manner. As a result, by confirming the associated usage information and the assisted person management information, the assisting person or the like using assistance information management system 1 can easily grasp the association between the use state of the assistance device by assisted person H and the change in assisted person H accompanying the use state. As a result, the assisting person or the like can grasp the effect imparted to assisted person H by using assistance device 10.

In addition, in assistance information management system 1, presentation section 106 presents the time-series change in the number of times assistance device 10 is used for each of multiple predetermined periods and the time-series change in the assisted person management information corresponding to each of multiple predetermined periods in a comparable manner. As a result, assistance information management system 1 can easily grasp the association between the number of uses of assistance device 10 and the assisted person H due to the increase or decrease in the number of uses.

12. Modification Aspect of Embodiment

In the embodiment, management device 100 acquires usage record data M1 recorded by assistance device 10 via management server 90. On the other hand, management device 100 may acquire usage record data M1, for example, by directly communicating with assistance device 10 via the LAN. Furthermore, assistance information management system 1 may have a part of the configuration of management device 100 as the configuration of assistance device 10 or management server 90. For example, assistance information management system 1 may be configured to generate presentation data in assistance device 10 or management server 90, and to store the generated presentation data in storage section 101 of management device 100.

REFERENCE SIGNS LIST

1: assistance information management system, 10: assistance device, 101a: usage record data storage section, 101b: assistance record data storage section, 103: extraction section, 104: number-of-times calculation section, 105: association section, 106: presentation section, H: assisted person, M1: usage record data, M2: assistance record data

The invention claimed is:

1. An assistance information management system comprising:
    an assistance device, comprising:
        a base;
        a support member, configured to be moveable relative to the base, the support member is adapted to support an assisted person;
        a driving device, comprising a motor, configured to move the support member relative to the base;
        an up button, configured to lift the support member via the driving device;
        a down button, configured to lower the support member via the driving device;
    at least one memory, configured to function as:
        a usage record data storage section storing usage record data in which usage information on use of an assistance device assisting an operation of an assisted person is recorded in association with usage time information on a date and time when the assistance device is used and assisted person identification information used to identify the assisted person using the assistance device, wherein the usage information is recorded in the usage record data when at least one of the up button or the down button is continuously pressed for a predetermined time or longer;
        an assistance record data storage section storing assistance record data in which assisted person management information which is information on the assisted person and is changeable with a passage of time is recorded in association with management time information on a time of the assisted person management information and the assisted person identification information;
    a display, comprising a screen;
    a processor, configured to function as:
        an input section, configured to receive the assisted person identification information from at least one of a keyboard, a mouse, a touch panel, a camera or a microphone;
        an extraction section configured to extract the usage information and the assisted person management information on a specific assisted person based on the assisted person identification information included in the usage record data and the assisted person identification information included in the assistance record data;
        an association section configured to periodically associate the usage information and the assisted person management information with each other, which are extracted by the extraction section, based on the usage time information and the management time information;
        a presentation data generation section, configured to generate a presentation data, wherein the presentation data is generated by processing the usage information and the assisted person management information associated with each other by the association section;
        a number-of-times calculation section configured to calculate a number of times the assistance device is used in a predetermined period for multiple predetermined periods based on the usage time information, wherein the association section associates the number of times the assistance device is used and the assisted person management information for each predetermined period based on the usage time information and the management time information; and
        a presentation section configured to display the presentation data of the specific assisted person corresponding to the assisted person identification information received from the input section on the screen, including a time-series change in the number of times the assistance device is used for each of the multiple predetermined periods and a time-series change in the assisted person management information corresponding to each of the multiple predetermined periods in a comparable manner, wherein the assisted person management information includes at least one of:
            a weight of the assisted person;
            a blood pressure value of the assisted person;
            a number of times a specific assistance treatment is performed on the assisted person; or
            a number of times of a specific action is performed by the assisted person, wherein the extraction section is configured to:
            collate the assisted person identification information inputted by the input section with the assisted person identification information included in the usage record data to extract the usage information and the usage time information associated with the corresponding assisted person identification information from the usage record data, and
            collate the assisted person identification information inputted by the input section with the assisted person identification information included in the assistance record data to extract the assisted person management information and the management time information associated with the corresponding assisted person identification information from the assistance record data.

2. The assistance information management system according to claim 1, wherein
    the assisted person management information includes physical record information on a body of the assisted person within the predetermined period.

3. The assistance information management system according to claim 2, wherein
the physical record information includes at least one of a weight of the assisted person and a blood pressure value of the assisted person.

4. The assistance information management system according to claim 1, wherein
the assisted person management information includes treatment frequency information on the number of times the specific assistance treatment is performed for the assisted person within the predetermined period.

5. The assistance information management system according to claim 4, wherein
the treatment frequency information includes at least one of a number of times of diaper replacement and a number of times of administration of a drug.

6. The assistance information management system according to claim 1, wherein
the assisted person management information includes action frequency information on the number of times the assisted person performs the specific action within the predetermined period.

7. The assistance information management system according to claim 6, wherein
the action frequency information includes at least one of a number of times of using a toilet, a number of times of bathing, and a number of times of participation in recreation.

8. The assistance information management system according to claim 6, wherein
the association section specifies an action corresponding to use of the assistance device based on the usage time information and the management time information, and
the presentation section presents the action specified by the association section as a use application of the assistance device.

9. The assistance information management system according to claim 1,
wherein the presentation data is generated via processing the usage information and the assisted person management information associated with each other by the association section, so as to provide an association between the use state of the assistance device by the assisted person and a change in a weight of the assisted person,
wherein the presentation section is configured to display a notification that the use of the assistance device increases or decreases the weight of the assisted person,
wherein the presentation section is configured to display a notification that the assisted person should use the assistance device more frequently or less frequently.

10. The assistance information management system according to claim 1,
wherein the presentation data is generated via processing the usage information and the assisted person management information associated with each other by the association section, so as to provide an association between the use state of the assistance device by the assisted person and a change in a number of times of diaper replacement of the assisted person,
wherein the presentation section is configured to display a notification that the use of the assistance device increases or decreases the number of times of diaper replacement of the assisted person,
wherein the presentation section is configured to display a notification that the assisted person should use the assistance device more frequently or less frequently.

11. The assistance information management system according to claim 1,
wherein the presentation data is generated via processing the usage information and the assisted person management information associated with each other by the association section, so as to provide an association between the use state of the assistance device by the assisted person and a change in a number of times of administration of laxative to the assisted person,
wherein the presentation section is configured to display a notification that the use of the assistance device increases or decreases the number of times of administration of laxative to the assisted person,
wherein the presentation section is configured to display a notification that the assisted person should use the assistance device more frequently or less frequently.

12. The assistance information management system according to claim 1,
wherein the presentation data is generated via processing the usage information and the assisted person management information associated with each other by the association section, so as to provide an association between the use state of the assistance device by the assisted person and a change in a number of times of using a toilet,
wherein the presentation section is configured to display a notification that the use of the assistance device increases or decreases the number of times of using the toilet,
the presentation section is configured to display a notification that the assisted person should use the assistance device more frequently or less frequently.

* * * * *